United States Patent
Lahtinen et al.

(10) Patent No.: US 7,294,319 B2
(45) Date of Patent: Nov. 13, 2007

(54) METHOD FOR PRECIPITATING IRON FROM A ZINC SULPHATE SOLUTION AS HEMATITE

(75) Inventors: Marko Lahtinen, Pori (FI); Leena Lehtinen, Pori (FI); Heikki Takala, Pori (FI)

(73) Assignee: Outotec Oyj, Espoo (FI)

( * ) Notice: Subject to any disclaimer, the term of this patent is extended or adjusted under 35 U.S.C. 154(b) by 269 days.

(21) Appl. No.: 10/497,821

(22) PCT Filed: Dec. 3, 2002

(86) PCT No.: PCT/FI02/00972

§ 371 (c)(1),
(2), (4) Date: Jun. 7, 2004

(87) PCT Pub. No.: WO03/056042

PCT Pub. Date: Jul. 10, 2003

(65) Prior Publication Data

US 2005/0069474 A1    Mar. 31, 2005

(30) Foreign Application Priority Data

Dec. 13, 2001  (FI) .................................. 20012450

(51) Int. Cl.
*C01G 49/06*    (2006.01)
*C22B 3/44*     (2006.01)

(52) U.S. Cl. ...................... 423/140; 423/138; 423/142; 423/544; 423/633

(58) Field of Classification Search ................ 423/138, 423/140, 544, 633, 142
See application file for complete search history.

(56) References Cited

U.S. PATENT DOCUMENTS

| | | | | |
|---|---|---|---|---|
| 3,755,098 | A | * | 8/1973 | Major et al. ................. 205/602 |
| 3,976,743 | A | | 8/1976 | Landucci et al. ............ 423/101 |
| 4,176,160 | A | * | 11/1979 | Pavonet ....................... 423/104 |
| 4,362,702 | A | | 12/1982 | Rastas et al. ................. 423/41 |
| 4,610,721 | A | * | 9/1986 | Duyvesteyn et al. ........ 423/109 |
| 5,453,253 | A | * | 9/1995 | Von Ropenack et al. ... 423/138 |

FOREIGN PATENT DOCUMENTS

| | | |
|---|---|---|
| EP | 1122324 | 8/2001 |
| SU | 1740464 | 6/1992 |
| WO | WO 93/15236 | 8/1993 |
| WO | WO 02/50319 | 6/2002 |

OTHER PUBLICATIONS

Monterey zinc sulfate solution 12% Material Safety Data Sheet, Issue date Mar. 2006.*

* cited by examiner

*Primary Examiner*—Ngoc-Yen Nguyen
(74) *Attorney, Agent, or Firm*—Morgan & Finnegan, L.L.P.

(57) ABSTRACT

This invention relates to a method for the removal of iron as hematite from a zinc sulphate solution in atmospheric conditions during the electrolytic preparation of zinc. According to the method, the pH of the iron-containing solution is adjusted to a value of at least 2.7, oxygen-containing gas is fed into the solution and part of the hematite thus formed is recirculated to the precipitation stage.

8 Claims, No Drawings

METHOD FOR PRECIPITATING IRON FROM A ZINC SULPHATE SOLUTION AS HEMATITE

This invention relates to a method for the removal of iron as hematite from a zinc sulphate solution in atmospheric conditions during the electrolytic preparation of zinc.

Zinc calcine, obtained by roasting sulphidic zinc concentrates, is generally used as the starting material in the electrolytic preparation of zinc. The main component of the calcine is zinc oxide, ZnO, but some of the zinc is also bound to iron in the form of zinc ferrite $ZnO.Fe_2O_3$. The amount of zinc ferrite is usually so considerable that recovering the zinc from it is unavoidable. Zinc oxide is easily soluble even at high pH values, whereas the ferrite has to be leached at a higher acid content. Ferrite leaching is performed in a separate stage, where both zinc and iron are dissolved. The iron has to be precipitated from the solution obtained before the solution can be returned to the neutral leach and from there to zinc sulphate solution purification and electrolysis. The above process is described e.g. in U.S. Pat. Nos. 3,434,947 and 3,493,365.

In industrial processes zinc oxide leaching, a neutral leach, is generally carried out at a pH of 2-5 and ferrite leaching at an acid content of between 30-100 g $H_2SO_4$/l. The solution from ferrite leaching, which contains the dissolved zinc and iron, is very acidic, and is often pre-neutralised before the iron is precipitated from it. Ferrite leaching can also be combined with the iron precipitation stage. This method is known as the conversion process and is described in U.S. Pat. No. 3,959,437.

Nowadays, the leaching of zinc concentrate is also combined with zinc oxide or calcine leaching in ever greater amounts. The concentrate is fed either to ferrite leaching or is leached as a separate pressure leach. The main component in concentrate leaching is zinc sulphide, ZnS. In this case too, some of the zinc is bound to zinc ferrite. In addition, the iron in the concentrate is bound to pyrite $FeS_2$, and some of the zinc of the zinc sulphide may be replaced by iron. For this reason an iron removal stage is also needed in a zinc process that is based on concentrate leaching or includes a concentrate leaching stage.

The zinc content of the zinc sulphate solution going to iron precipitation is usually of the order of 120-180 g/l. Depending on the process used, the amount of trivalent ferric iron in the zinc sulphate solution varies from a few grams up to dozens of grams per litre. Three iron precipitation processes are in use and in them the iron is precipitated as either jarosite $Na[Fe_3(SO_4)_2(OH)_6]$, goethite FeOOH or hematite $Fe_2O_3$.

When iron is precipitated as jarosite or goethite, a neutralising agent is to be used in precipitation to neutralise the sulphuric acid released in the reactions. Normally the neutralising agent is calcine.

A conventional jarosite process is described in the above-mentioned U.S. Pat. No. 3,434,947, whereby iron is precipitated at a temperature close to the boiling point. The free acid is neutralized to a value of 3-5 g/l $H_2SO_4$ (optimal pH 1.5). The amount of iron in the zinc sulphate solution is 20-35 g/l. In order for the jarosite to obtain an essentially crystalline form, which has beneficial settling properties, potassium, sodium or ammonia ions are also added to the solution.

Goethite precipitation is described for instance in U.S. Pat. No. 4,676,828. In this method, the amount of free acid in the zinc sulphate solution going to iron precipitation is 4-8 g/l and the amount of ferric iron 1-2 g/l. Oxygen and calcine are fed into the solution, so that the iron is precipitated as goethite.

When iron is precipitated as hematite according to the conventional method, it is performed from a solution, from which the iron is first reduced from trivalent to divalent form. After this, the iron is precipitated hydrolytically by oxidation without neutralisation:

$$2FeSO_4+O_2(g)+2H_2O \longrightarrow Fe_2O_3+2H_2SO_4 \quad (2)$$

The precipitation of iron must however be performed in an autoclave at temperatures of about 200° C. with a partial oxygen pressure of about 18 bar, which has essentially restricted the adoption of the method, even though hematite is in fact the most environmentally friendly form of iron precipitate.

Now it has surprisingly been discovered that, with the suitable adjustment of conditions, iron can be precipitated as hematite from an iron-containing zinc sulphate solution in atmospheric conditions too. The term atmospheric conditions here means conditions where the reactors used in the precipitation stage are unpressurised and the temperature of the zinc sulphate solution is regulated to between 80° C. and the boiling point of the solution. According to the method now developed, the pH of the solution is neutralised in the iron precipitation stage to a value of at least 2.7 and oxygen is fed into the solution or in the form of oxygen or oxygen-containing gas. During precipitation there should also be some hematite nuclei in the solution, i.e. the precipitate generated in precipitation is recirculated from the end of the precipitation stage back to the beginning. The essential features of the invention will be made apparent in the attached claims.

The sulphuric acid content of the zinc sulphate solution going to iron precipitation depends on the process used. Zinc sulphate solution from ferrite leaching is generally rather acidic, with perhaps 10-40 g sulphuric acid/l. If the solution comes from a concentrate leaching stage its sulphuric acid content may be a little lower. For hematite precipitation the solution must be neutralised before being fed to the iron precipitation stage. The sulphuric acid generated during hematite precipitation must also be neutralised in order to keep the pH stable. Neutralisation may be performed using any appropriate neutralising agent. Tests carried out show that the pH of the solution at the start of precipitation should be at least 2.7. The neutralising agent generally used in goethite and jarosite precipitation is calcine. In addition to calcine, calcium compounds are used as neutralising agents, and hydroxide and ammonia compounds such as sodium hydroxide are also effective neutralising agents.

The hematite precipitation reaction also requires oxygen, and so oxygen is fed to precipitation either as oxygen or in the form of an oxygen-containing gas such as air.

In hematite precipitation occurring in atmospheric conditions, it is essential that the hematite precipitate generated is recirculated to the start of the precipitation stage as hematite nuclei. Recirculation occurs for instance by routing the hematite precipitate obtained from the liquid-solid separation step after the precipitation stage back to the beginning of the process as seed nuclei for the new precipitate. Preferably at least ⅕ of the precipitate is recirculated to the beginning of the precipitation stage.

We have also found that thorough mixing of the neutralising agent and the recirculation hematite precipitate and a good, controlled dispersion of the oxygen-containing gas for the precipitation stage of the reactor slurry in both reactors have a beneficial effect on the iron being precipitated as hematite. One advantageous method is to use a mixer with low shear force but a diameter of over half that of the mixing reactor. One such mixer is described in U.S. Pat. No. 5,182,087, where the diameter of the mixer is at least 0.7 times that of the reactor.

The precipitation of iron as hematite, particularly when it can be performed in atmospheric conditions, is worthwhile in many respects. Firstly, the iron content of hematite is known to be double that of jarosite for example. This means that the amount of waste generated is about half the corresponding amount of jarosite. The zinc content of hematite is far below the level of zinc in jarosite and goethite, so that zinc recovery yields are improved. The table below presents a comparison between various process alternatives when hematite is formed in an autoclave (Okada, S. et al: "Zinc residue treatment at Iijima Refinery", TMS of AIME, Paper No. A84-51, p. 8):

|  | Hemalite | Jarosite | Goethite |
|---|---|---|---|
| Generated compound | $\alpha$-$Fe_2O_3$ | Me—$Fe_3(SO_4)_2(OH)_6$ | $\alpha$-FeOOH, $\beta$-FeOOH |
| Fe, wt % | 50-60 | 30-35 | 40-45 |
| Zn, wt % | 0.5-1.0 | 3-5 | 2-3 |
| Amount (dry) | 1.8 t/t Fe | 3.1 t/t Fe | 2.4 t/t Fe |
| Amount (wet) | 2.0 t/t Fe | 4.8 t/t Fe | 4.0 t/t Fe |
| Moisture content | 10% | 35% | 40% |

When researching the method of the present invention, it was found that hematite can be made to precipitate directly onto the hematite nuclei when the conditions are correct, as described above. If the conditions are not exactly right, precipitation may also occur partially as jarosite or goethite.

The precipitate obtained from the precipitation stage is routed to the normal solids separation, from where the iron-free zinc sulphate solution obtained is fed to the neutral leaching stage and the hematite precipitate either to the waste area or for further processing.

Many processes that are usually performed at increased pressure and temperatures, also work in atmospheric conditions, but the reactions required in the processes proceed so slowly that the method cannot be adopted. Research has now shown, however, that iron can be precipitated as hematite in atmospheric conditions and that the precipitation time is even shorter than for instance in jarosite precipitation. Thus it has been possible to precipitate the iron of a zinc sulphate solution as hematite in favourable conditions in an average of 3-6 hours.

The invention is further described with the aid of the following examples.

EXAMPLE 1

Iron was precipitated from a zinc sulphate solution in batch tests using a 5 l container as the mixing reactor and a gls mixer that disperses gas well, as described e.g. in U.S. Pat. No. 4,548,765. The pH of the zinc sulphate solution was raised with NaOH from a value of <1 to a value of 3.1 and kept at this value and at a temperature of 93° C. The solution contained about 120 g zinc/l and about 9.3 g iron/l. About 55 g/l of pure hematite was used as hematite nuclei. After 5.5 hours the iron had almost completely precipitated from the solution, and the final iron content in the solution was 65 mg/l. Thus the iron content of the batch-tested precipitate was 70 wt % and the zinc content about 0.5%. The hematite composition of the precipitate was confirmed by X-ray diffraction (XRD) analysis.

EXAMPLE 2

An iron precipitation test was carried out on a zinc sulphate solution in a continuous testing apparatus. The apparatus consisted of three mixing reactors, each of which having a volume of 5 l, and a thickener, also 5 l in volume. The temperature of the reactors was regulated at 96° C. and the pH at 3.0. The zinc sulphate solution, with an iron content of about 9.5 g/l and the pH raised to a value of 3.0, was fed into the first mixing reactor at a rate of 1000 ml/h. A spiral-type mixer was used as the reactor mixer, with which an even mixing was achieved throughout the whole solution volume. About 75% of the underflow of the mixer was recirculated back and the rest was taken out as hematite precipitate. The iron content of the overflow solution from the thickener was around 500 mg/l and the iron content of the underflow 52%. XRD analysis showed the precipitate to be hematite.

As shown by the examples above, iron precipitation from a zinc sulphate solution as hematite also works in atmospheric conditions, when the conditions are made favourable. In the batch test the iron content in the precipitate was even higher (70%) than the iron content reported in autoclave precipitation (50-60%), but the continuous test also reached the iron content levels of precipitate prepared in an autoclave. The precipitate obtained had good filtration properties.

The invention claimed is:

1. A method for the removal of iron as hematite from a zinc sulphate solution containing iron, comprising performing the iron precipitation stage in atmospheric conditions by using unpressurised reactors, keeping the temperature of the zinc sulphate solution in the region of 80° C.-96° C., feeding a neutralising agent in order to raise the pH of the zinc sulfate solution to at least 2.7 and an oxygen-containing gas into the solution, and carrying out the precipitation out in the presence of hematite nuclei.

2. A method according to claim 1, wherein the neutralising agent is calcine.

3. A method according to claim 1, wherein the neutralising agent is a calcium compound.

4. A method according to claim 1, wherein the neutralising agent is a hydroxide compound.

5. A method according to claim 1, wherein the neutralising agent and oxygen-containing gas are fed into the precipitation stage reactors evenly throughout the solution volume of the reactors.

6. A method according to claim 1, wherein at least ⅓ of the hematite generated is recirculated as hematite nuclei.

7. A method according to claim 1, wherein the oxygen-containing gas is oxygen.

8. A method according to claim 1, wherein the oxygen-containing gas is air.

* * * * *